United States Patent
Vilajosana Guillén et al.

(10) Patent No.: US 11,361,651 B2
(45) Date of Patent: Jun. 14, 2022

(54) MOISTURE SENSORS

(71) Applicant: FUNDACIÓ PER A LA UNIVERSITAT OBERTA DE CATALUNYA, Barcelona (ES)

(72) Inventors: Xavier Vilajosana Guillén, Cardedeu (ES); Joan Antoni Melià Seguí, Barcelona (ES)

(73) Assignee: FUNDACIÓ PER A LA UNIVERSITAT OBERTA DE CATALUNYA, Barcelona (ES)

( * ) Notice: Subject to any disclaimer, the term of this patent is extended or adjusted under 35 U.S.C. 154(b) by 0 days.

(21) Appl. No.: 17/269,014

(22) PCT Filed: Jul. 30, 2019

(86) PCT No.: PCT/EP2019/070476
§ 371 (c)(1),
(2) Date: Feb. 17, 2021

(87) PCT Pub. No.: WO2020/035306
PCT Pub. Date: Feb. 20, 2020

(65) Prior Publication Data
US 2021/0319687 A1    Oct. 14, 2021

(30) Foreign Application Priority Data

Aug. 17, 2018   (EP) .................................... 18382616

(51) Int. Cl.
*G08B 21/20*   (2006.01)
*G06K 19/07*   (2006.01)
(52) U.S. Cl.
CPC ......... *G08B 21/20* (2013.01); *G06K 19/0717* (2013.01)

(58) Field of Classification Search
CPC ... G08B 21/20; G06K 19/0717; G01N 27/223
See application file for complete search history.

(56) References Cited

U.S. PATENT DOCUMENTS 6,774,800 B2 * 8/2004 Friedman ............. A61B 5/0002
340/572.5
9,681,996 B2 * 6/2017 Prioleau .................. A61F 13/42
(Continued)

FOREIGN PATENT DOCUMENTS

CN          102722966 A    10/2012
WO   WO/2014/043445 A2     3/2014

OTHER PUBLICATIONS

International Search Report and Written Opinion of the International Searching Authority. International Application No. PCT/EP2019/070476 issued by the European Patent Office, dated Oct. 25, 2019, 5 pages, Rijswijk, Netherlands.
(Continued)

*Primary Examiner* — Adnan Aziz
(74) *Attorney, Agent, or Firm* — Peter B. Scull; EIP US

(57) ABSTRACT

The present disclosure relates to a moisture sensor. The moisture sensor includes at least one non-shielded sensor element having at least an antenna and an element made of a liquid absorbing material, the material being configured to drive liquid to the antenna when liquid is in contact with the material; at least one shielded sensor element having at least an antenna and an element made of a non-conducting liquid proof material. The moisture sensor may be included in a system for detecting moisture.

6 Claims, 4 Drawing Sheets

(56) References Cited

U.S. PATENT DOCUMENTS

| | | | |
|---|---|---|---|
| 9,959,739 B1* | 5/2018 | Lui | G08B 21/20 |
| 10,159,607 B2* | 12/2018 | Monson | G16H 40/20 |
| 2002/0145526 A1* | 10/2002 | Friedman | A61B 5/1113 |
| | | | 340/573.5 |
| 2007/0090927 A1 | 4/2007 | Potyrailo et al. | |
| 2007/0171083 A1* | 7/2007 | Kou | G01N 27/223 |
| | | | 340/604 |
| 2009/0231102 A1* | 9/2009 | Hyde | A01G 9/006 |
| | | | 340/10.1 |
| 2010/0090802 A1 | 4/2010 | Nilsson et al. | |
| 2010/0283626 A1* | 11/2010 | Breed | B60R 21/01554 |
| | | | 340/8.1 |
| 2012/0166095 A1* | 6/2012 | Potyrailo | G01N 27/3278 |
| | | | 702/23 |
| 2014/0022058 A1 | 1/2014 | Striemer et al. | |
| 2014/0028330 A1* | 1/2014 | Potyrailo | G06K 19/0716 |
| | | | 324/633 |
| 2015/0001200 A1* | 1/2015 | Harper | G01N 27/223 |
| | | | 219/209 |
| 2015/0130637 A1* | 5/2015 | Sengstaken, Jr. | G08C 17/02 |
| | | | 340/870.16 |
| 2015/0179037 A1* | 6/2015 | Ren | G01L 7/18 |
| | | | 340/522 |
| 2017/0065464 A1 | 3/2017 | Heil et al. | |
| 2017/0110796 A1 | 4/2017 | Rokhsaz et al. | |
| 2017/0160220 A1* | 6/2017 | Young | G08C 17/00 |
| 2017/0255854 A1* | 9/2017 | Bhatia | G06K 19/07345 |
| 2017/0331459 A1* | 11/2017 | Rokhsaz | H04B 5/0062 |
| 2017/0373395 A9 | 12/2017 | Rokhsaz et al. | |
| 2018/0002916 A1 | 1/2018 | Harrison et al. | |

OTHER PUBLICATIONS

Extended European Search Report for Application No. EP18382616 dated Feb. 13, 2019, 9 pages, issued by the European Patent Office, Munich, Germany.

* cited by examiner

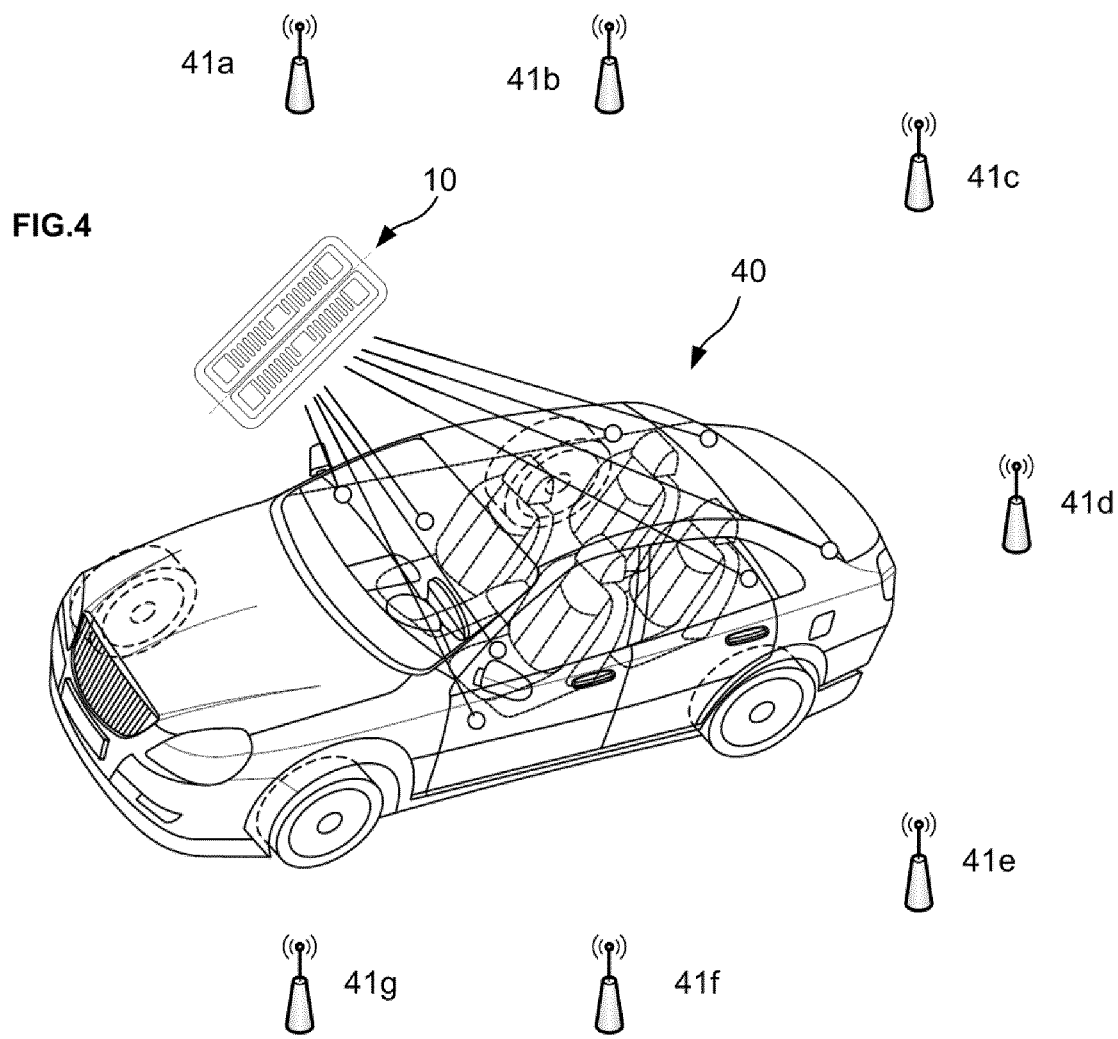
FIG.4
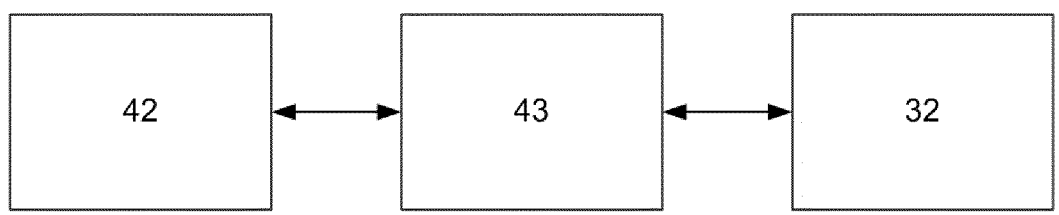

MOISTURE SENSORS

The present disclosure relates to moisture sensors. Furthermore, the present disclosure relates to methods of detecting moisture, for example, due to liquid leakages, and systems and computer program products suitable for executing the methods.

BACKGROUND

It is known to use moisture sensors in environments such as industry, home or office with the aim of measuring moisture condition changes, that is, for example, to detect liquid (e.g. water) leakages, that can imply vulnerabilities.

The moisture sensors may be wired or wireless sensors. Both wired and wireless sensors have benefits and disadvantages.

In many situations wired sensors are among the most reliable systems as they directly link the sensor to the device that is receiving the input. This means that wired sensors are also the most durable systems which do not need to be replaced often. However, it should be noted that wired systems are connected to power, require a large amount of space, are not suitable for moving environments and are much more complicated to maintain. This burden increases in size as more sensors are used based on the application that the sensor is designed for. Consequently, under determined conditions (e.g. in moving elements), wired sensors may be not recommended for sensing moisture.

On the other hand, wireless sensors are becoming more common in the world of sensor-based applications. This is mainly because they are cheaper to install, can be installed in moving elements and are easy to maintain. Wireless radios or transducers can be connected to moisture sensors and actively obtain moisture readings. Active sensors require batteries which increase maintenance and base cost. Passive radios such as Radio-Frequency IDentification (RFID) technology, for example, UHF passive RFID labels can also be connected to moisture sensors but this limits their capabilities to respond as more energy is required to power the sensor and the regulations do not allow much more power to be used for longer.

The fundamentals of the moisture detection by a moisture sensor are based on the fact that it is possible to detect the presence of moisture due to changes in the impedance or read voltage from the moisture sensor, when in contact with liquid (for example, when a liquid leakage has occurred).

It is interesting to the industry to use moisture sensors with wireless communication capabilities, aka wireless moisture sensors. The industry requires low cost and low maintenance sensors and hence RFID technology, for example, UHF passive RFID when combined with moisture sensing capabilities are relevant.

However, the use of an RFID radio with a moisture sensor is expensive and usually limits its functionality as the amount of energy required to obtain a significative response is larger than what is possible due to regulations.

Yet, the impedance variations due to moisture presence can be perceived through the variations of the impedance of the RFID antenna.

In a typical deployment, the wireless moisture sensors require to be read (i.e. the reader sends a signal to the sensor and reads its response) at least twice. In a first time, the wireless moisture sensor must be calibrated, that is, the reader needs to obtain a first response signal from the sensor before the sensor is in use. Some features of the obtained first response signal then may be used as reference features for later sensor readings.

This way, for detecting moisture (e.g. when a liquid leakage has occurred), the moisture sensor may be read at least a second time and the features of the obtained second response signal must be compared with the previously obtained reference features.

On the other hand, because the conditions (for example, environmental conditions such as temperature, humidity, etc.) of the first reading and the second reading (or later readings) may be quite different, false positives may occur.

Finally, data transmitted through the response signal may be corrupted if the features of the response signal are too altered.

Consequently, there is a need for moisture sensors that at least partially may solve one or more the aforementioned problems.

SUMMARY

In a first aspect, a moisture sensor is provided. The moisture sensor includes at least one non-shielded sensor element including at least an antenna and an element made of a liquid absorbing material, the material being configured to drive liquid to the antenna when liquid is in contact with the material; at least one shielded sensor element including at least an antenna and an element made of a non-conducting liquid proof material.

The provision of the shielded sensor element allows obtaining a reference response signal to determine the presence of moisture. Because the shielded sensor element is protected against liquids, normally its response signal is not altered or modified with the presence of liquid because its antenna is always dry. Obviously, for example, external conditions (e.g. temperature provided by the liquid) may alter its response signal but this alteration will be different from the alteration of the non-shielded sensor element when is wet and a significant variation between the response signals may be determined. On the other hand, the liquid absorbing material of the non-shielded sensor element facilitate the contact of the liquid with the antenna so that, in case of presence of liquid, some features (for example, the signal strength and/or the signal phase) of its response signal may be altered.

More specifically, the fundamentals of the moisture detection include that the liquid absorbing material of the non-shielded sensor element absorbs the liquid/moisture and transports it to the non-shielded antenna. When the non-shielded antenna is wet its matching varies causing a variation in the strength, phase or other features of the response signal. Thus, at least one of the features may be compared with the same feature of the reference response signal of the shielded sensor element and used to determine if the moisture sensor has been exposed to liquid, that is, it can be determined that, for example, a liquid leakage has occurred if the difference between the features are significant (moisture is detected). Consequently, it is possible to detect the presence of moisture with only one reading of the moisture sensor because, at the same time or at about the same time, the response signal of the non-shielded sensor element and the response signal of the shielded sensor element are obtained.

According to some examples, the non-shielded sensor element and the shielded sensor element may be placed next to each other. This way, the conditions (for example, environmental conditions such as temperature, humidity, atmospheric pressure, etc.) during the readings are the same for both sensor elements so that the number of false positives may be reduced or eliminated.

In some examples, the element made of a liquid absorbing material may include at least one liquid absorbing material tail. Consequently, the reach of the non-shielded sensor element may be extended. Furthermore, the tail may be attached or be attachable to the element made of a liquid absorbing material of the non-shielded sensor element.

The element made of a liquid absorbing material may be the substrate of the non-shielded sensor element so that the antenna may be provided on and in contact with the element made of a liquid absorbing material. In the same way, the element made of a non-conducting liquid proof material may be the substrate of the shielded sensor element.

Basically, a moisture sensor may be a wired or wireless sensor. In addition, a wireless moisture sensor may be a passive or active sensor. In some examples, at least one of the non-shielded sensor element and the shielded sensor element may include an RFID label. In this case, the antenna of the sensor element is the antenna of the RFID label. For example, the RFID label may be a passive RFID label, such as a UHF passive RFID label. The use of RFID labels reduces the sensing device cost. Also, a moisture sensor based on standards (e.g. RFID) allows for better integration in the industry (e.g. provider independence).

On the other hand, the configuration of the non-shielded sensor element and the shielded sensor element may be equal for assuring that the comparison of features of their corresponding response signals is effective.

According to another aspect, a method of detecting moisture is disclosed. The method may be executable by a control module. The control module may be included in a system for detecting moisture. The system may include at least one moisture sensor as described above, a reader module configured to receive at least one response signal from the non-shielded sensor element and at least one response signal from the shielded sensor element included in the moisture sensor and to obtain at least one feature of the response signal received from the non-shielded sensor element and the same feature of the response signal received from the shielded sensor element, and the control module. The method includes, for each moisture sensor:

the control module receiving the feature of the response signal of the non-shielded sensor element, from the reader module;
the control module receiving the same feature of the response signal of the shielded sensor element, from the reader module;
the control module comparing the received feature of the response signal of the non-shielded sensor element with the same received feature of the response signal of the shielded sensor element;
the control module determining the detection of moisture if the difference between the feature of the response signal of the non-shielded sensor element and the feature of the response signal of the shielded sensor element is significant.

The significant difference to determine moisture may be based on a threshold (it may be different under different conditions) or may be based on a variation value (e.g. a variation of at least 20% from the standard deviation may be established to determine moisture).

This way, the previously disclosed moisture sensor may be used in a method of detecting moisture, for example, due to a liquid leakage.

Consequently, if the received feature of one sensor element is, for example, the strength of the response signal, the feature must be compared with the strength of the response signal (i.e. the same characteristic as that obtained from the previous sensor element) of the other sensor element of the moisture sensor. If the received features of one sensor element is, for example, the strength and the phase of the response signal, the strength must be compared with the strength of the response signal of the other sensor element and the phase must be compared with the phase of the response signal of the other sensor element of the moisture sensor. In addition, the phase and/or the strength of the response signal may be obtained in different frequency channels (for example to avoid interference or to have redundant information). Then, it is also possible to use the phase and/or the strength of the response signal of a sensor element in one particular channel or in each channel separately, or, for example, it is possible to use the arithmetic mean (or any other statistical concept) of the phase and/or strength according its value in several channels, to determine the moisture detection. Using more than one feature (or different values of the same feature) may improve the detection of moisture.

In some examples, the at least one feature of the response signal may include the signal strength and/or the signal phase. The features may be obtained by the reader module and sent to the control module to be processed. The response signal may refer to the response signal of the non-shielded sensor element and/or to the response signal of the shielded sensor element.

According to some examples, the method may include receiving data uniquely identifying the moisture sensor, from the reader module. This data may be obtained by the reader module from the response signal and sent to the control module together with the at least one feature also obtained from the response signal. In case of data transmitted by the response signal of the non-shielded sensor element are too altered (for example, because the modulation of the response signal is not robust enough), the moisture sensor may be identified by data uniquely identifying the moisture sensor obtained from the response signal of the shielded sensor element because it always is dry. Data uniquely identifying the moisture sensor associated to each sensor element may be stored in a repository (e.g. a database) such that the moisture sensor may be identified from data of any of its sensor elements.

In some examples, the method may further include obtaining the location of the moisture sensor based on, for example, data uniquely identifying the moisture sensor and/or the strength of the response signal. The position or location of a sensor element (e.g. a RFID label) may be determined by the strength of the received response signal. There are propagation models that relate the received signal strength with the distance of the sensor element. If this situation is combined with readings from different positions (e.g. from an arch of readers) combined with data uniquely identifying the sensor element, it is possible to determine with redundancy the distance between different readers and the sensor element.

In addition, the method may further include, if moisture is detected, generating a warning related to the detected moisture, through a warning module. The generated warning may include the location of the moisture sensor that detects the moisture.

According to another aspect, a computer program product is disclosed. The computer program may include program instructions for causing a control module to perform a method of detecting moisture as described above. The computer program may be embodied on a storage medium (for example, a CD-ROM, a DVD, a USB drive, on a computer memory or on a read-only memory) or carried on a carrier signal (for example, on an electrical or optical carrier signal).

According to yet another aspect, a control module is provided. The control module may be included in a system for detecting moisture, for example, due to a liquid leakage. The system may include at least one moisture sensor as described above, a reader module configured to receive at least one response signal from the non-shielded sensor element and at least one response signal from the shielded sensor element included in the moisture sensor and to obtain at least one feature of the response signal received from the non-shielded sensor element and the same feature of the response signal received from the shielded sensor element, and the control module. The control module provides:

receiving the feature of the response signal of the non-shielded sensor element, from the reader module;
receiving the same feature of the response signal of the shielded sensor element, from the reader module;
comparing the received feature of the response signal of the non-shielded sensor element with the same received feature of the response signal obtained of the shielded sensor element;
determining the detection of moisture if the difference between the feature of the response signal of the non-shielded sensor element and the feature of the response signal of the shielded sensor element is significant.

In another aspect, a control module is provided. The control module includes a memory and a processor, embodying instructions stored in the memory and executable by the processor, the instructions including functionality to execute a method of detecting moisture as disclosed herein.

According to another aspect, a control module is provided. The control module may be included in a system for detecting moisture, for example, due to a liquid leakage. The system may include at least one moisture sensor as described above, a reader module configured to receive at least one response signal from the non-shielded sensor element and at least one response signal from the shielded sensor element included in the moisture sensor and to obtain at least one feature of the response signal received from the non-shielded sensor element and the same feature of the response signal received from the shielded sensor element, and the control module. The control module is configured to:

receive the feature of the response signal of the non-shielded sensor element, from the reader module;
receive the same feature of the response signal of the shielded sensor element, from the reader module;
compare the received feature of the response signal of the non-shielded sensor element with the same received feature of the response signal of the shielded sensor element;
determine the detection of moisture if the difference between the feature of the response signal of the non-shielded sensor element and the feature of the response signal of the shielded sensor element is significant.

The control module may further include a warning module configured to generate a warning when a moisture detection is determined. The warning module may include at least one of the following sub-modules:

a sub-module including at least one warning element for generating an audible warning (e.g. a speaker, a buzzer, etc.);
a sub-module including at least one warning element for generating a visual warning (e.g. a display screen (LCD, OLED, QLED, etc.), a plurality of Light Emitting Diodes (LED), etc.);
a sub-module including at least one warning element for generating a haptic warning (e.g. a vibrator motor).

In another aspect, a system for detecting moisture is disclosed. The system may include:

at least one moisture sensor as described herein;
a reader module configured to receive at least one response signal from the non-shielded sensor element and at least one response signal from the shielded sensor element included in the moisture sensor and to obtain at least one feature of the response signal received from the non-shielded sensor element and the same feature of the response signal received from the shielded sensor element;
a control module as described herein.

This way, the system may be used, for example, to automatically detect water leakages inside vehicles in the assembly line, and similar scenarios. Because, the previously disclosed moisture sensors are used, the detection is performed by low cost (<10 cents of euro) battery-less sensors that are pre-deployed inside the vehicle during the manufacturing process. Those sensors, after a water test, are polled by readers (for example, RFID readers) in order to determine if any water leakage has occurred. The system detects levels of moisture corresponding to a leakage and automatically may locate their position without human intervention. The operator is warned by the system about a detected moisture and its location without the need to enter inside the vehicle. The moisture sensors may be dropped inside the vehicle under manufacturing.

The reader module may be easily integrable in the production chain of vehicles or in any other application or scenario. In some examples, the reader module may include a static set of antennas (for example, an arch of antennas) and/or a hand-held reader.

The system may further include a warning module configured to generate a warning when a moisture detection is determined. The warning module may include at least one of the following sub-modules:

a sub-module including at least one warning element for generating an audible warning (e.g. a speaker, a buzzer, etc.);
a sub-module including at least one warning element for generating a visual warning (e.g. a display screen (LCD, OLED, QLED, etc.), a plurality of Light Emitting Diodes (LED), etc.);
a sub-module including at least one warning element for generating a haptic warning (e.g. a vibrator motor).

In the system, the warning module may be included in the control module described above and/or may be provided external to the control module.

In some examples, the response signal from the non-shielded sensor element and the response signal from the shielded sensor element may be received by the reader module at the same time or at about the same time. This way, obtaining the response signal of each sensor element is performed under the same conditions.

Additional objects, advantages and features of embodiments of the inventions hereof will become apparent to those skilled in the art upon examination of the description, or may be learned by practice of the inventions hereof.

DESCRIPTION OF THE DRAWINGS

Particular embodiments of the present inventions will be described in the following by way of non-limiting examples, with reference to the appended drawings, in which:

FIG. 4 illustrates a schematic diagram of a system for detecting moisture applied to an assembly process of vehicles with the aim of detecting water leakages inside the vehicle.

DETAILED DESCRIPTION

Figure 1:
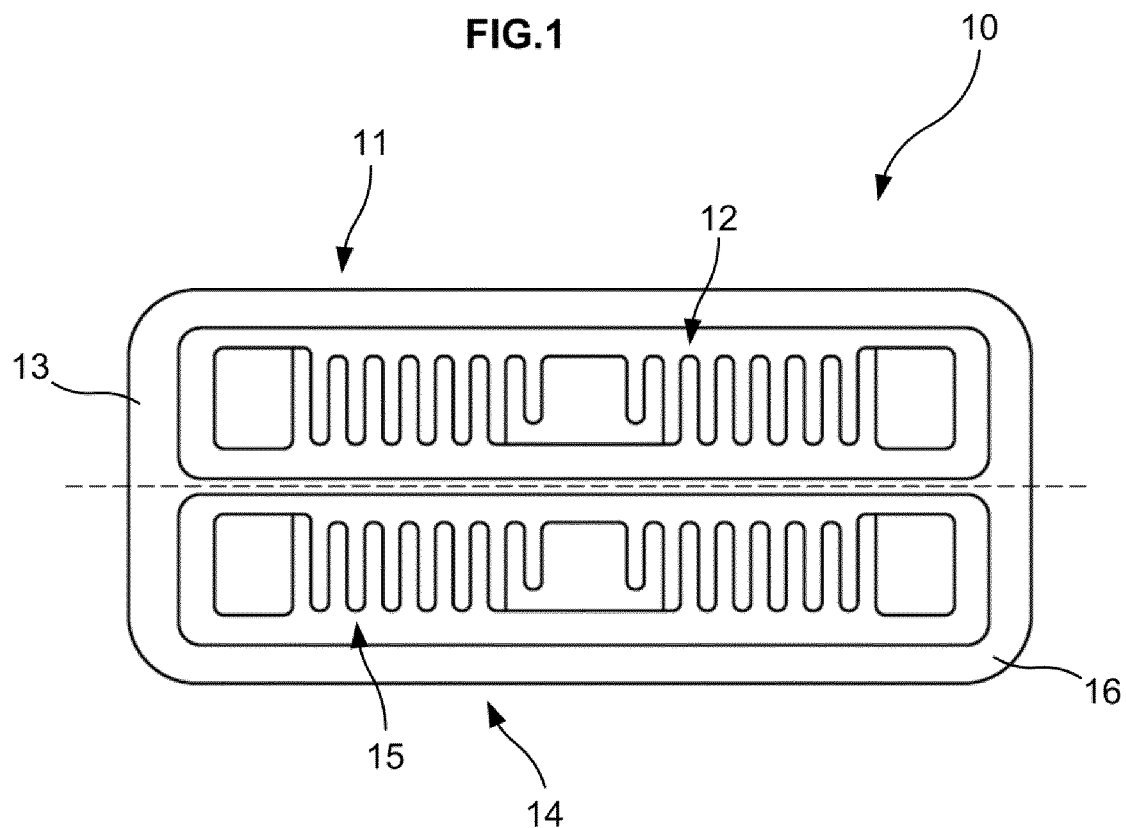
FIG. 1 illustrates a schematic diagram of a moisture sensor according to some examples.

As can be seen in FIG. 1, a moisture sensor 10 may include:

- at least one non-shielded sensor element 11 including at least an antenna 12 and an element 13 made of a liquid absorbing material, the material being configured to drive liquid to the antenna 12 when liquid is in contact with the material;
- at least one shielded sensor element 14 including at least an antenna 15 and an element 16 made of a non-conducting liquid proof material.

According to a possible configuration of the moisture sensor 10, the non-shielded sensor element 11 and the shielded sensor element 14 may be placed next to each other as shown in FIG. 1. This way, the conditions (for example, environmental conditions such as temperature, humidity, etc.) during the readings are the same for both sensor elements 11,14 so that the number of false positives when detecting moisture may be reduced or eliminated.

The element 13 made of a liquid absorbing material may include at least one liquid absorbing material tail with the aim to extend the reach of the non-shielded sensor element 11. Furthermore, the tail may be attached or be attachable to the element 13 made of a liquid absorbing material of the non-shielded sensor element 11, that is, the tail may be placed ad-hoc by the moisture sensor manufacturer or may be placed by the user or the installer of the moisture sensor 10.

In case of the moisture sensor 10 includes more than one non-shielded sensor element 11 and/or more than one shielded sensor element 14, the response signal of any or all of the sensor elements may be used for determining a moisture detection.

On the other hand, the configuration of the non-shielded sensor element 11 and the shielded sensor element 14 may be equal for assuring that the comparison of features of their corresponding response signals is effective as will be described later.

The element 13 made of a liquid absorbing material may be the substrate of the non-shielded sensor element 11 while the element 16 made of a non-conducting liquid proof material may be the substrate of the shielded sensor element 14.

The liquid absorbing material may be any hydrophilic material such as paper (e.g. litmus paper, blotting paper, paper without glue), absorbent textiles (e.g. cotton, linen, etc.) or synthetic materials (e.g. polyamide microfibers).

The non-conducting liquid proof material may be any liquid proof material such as polyethylene derivatives, PVC, etc. This way, the antenna is shielded with a non-conducting liquid proof material.

The fundamentals of the moisture detection are based on the fact that the liquid absorbing material absorbs the liquid/moisture and transports or drives it to the non-shielded antenna 12 of the non-shielded sensor element 11. When the non-shielded antenna 12 is humidified its matching varies causing a variation in the strength, phase or other features of its response signal. Thus, at least one feature (e.g. strength, phase, etc.) of the response signal provided by the non-shielded sensor element 11 may be compared with the same feature of the response signal provided by the shielded sensor element 14 and used to determine if the non-shielded sensor element 11 has been exposed to liquid (detection of moisture) when the different between the features is significant.

An example of determining the detection of moisture with the moisture sensor described above may be seen in FIG. 2.

Figure 2:
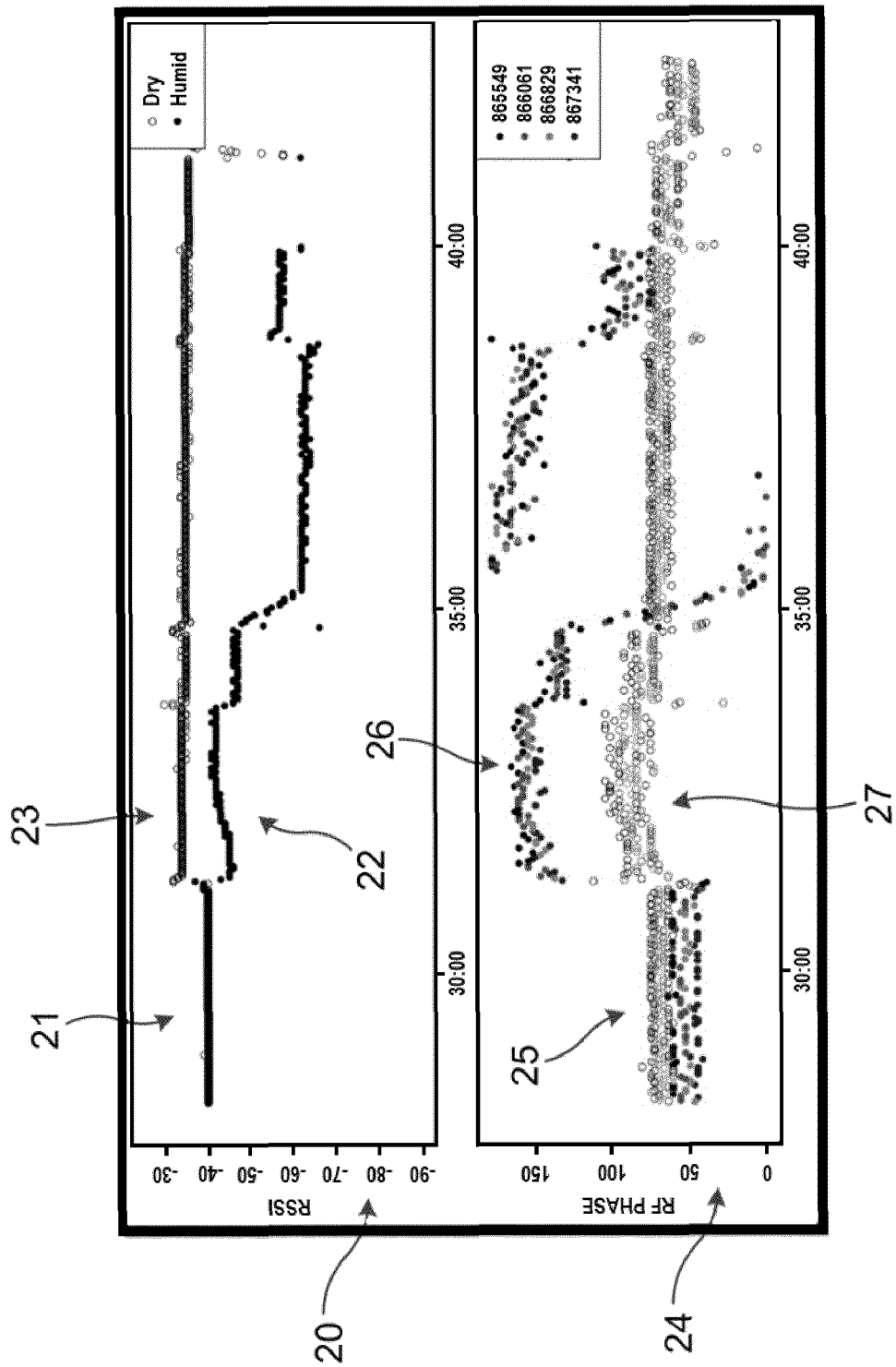
FIG. 2 illustrates a graphical diagram of the behavior of a moisture sensor when moisture is detected.

FIG. 2 illustrates a first chart 20 in which it is possible to analyse the strength (RSSI—Received Signal Strength Indicator) of the response signals over time (minutes) provided by the non-shielded sensor element 11 and the shielded sensor element 14. Until minute 31 or 32, the behavior 21 (at level of RSSI) of the response signals of the non-shielded sensor element 11 and the shielded sensor element 14 is more or less the same. From that minute, the behavior 22 of the response signal of the non-shielded sensor element 11 varies and its RSSI is reduced considerably (it could also have increased) as the non-shielded sensor element 11 gets wet. In the meantime, the behavior 23 of the response signal of the shielded sensor element 14 remains more or less immovable. This way, from that minute, if the response signal strength obtained from the non-shielded sensor element 11 is compared with the response signal strength obtained from the shielded sensor element 14, the difference is significant, and it may be determined that moisture is detected.

On the other hand, FIG. 2 2 illustrates a second chart 24 in which it is possible to analyse the phase of the response signals in different frequency channels (e.g., in FIG. 2 2, 865.54 Mhz, 866.061 Mhz, 866.829 MHz and 867.341 MHz) over time (minutes) obtained from the non-shielded sensor element 11 and the shielded sensor element 14. Again, until minute 31 or 32, the behavior 25 (at level of phase) of the response signals of the non-shielded sensor element 11 and the shielded sensor element 14 is more or less the same, in any frequency channel. From that minute, the behavior 26 of the non-shielded sensor element 11 varies (in all frequency channels) and its phase varies considerably as the non-shielded sensor element 11 gets wet. In the meantime, the behavior 27 of the shielded sensor element 14 remains more or less immovable, in any frequency channel. This way, if the response signal phase obtained from the non-shielded sensor element 11 is compared with the response signal phase (for example, in any frequency channel) obtained from the shielded sensor element 14, the difference is significant, and it may be determined that moisture is detected.

According to some examples, the non-shielded sensor element 11 and/or the shielded sensor element 14 may include a standard RFID label, such as a UHF passive RFID label. In this case, the antenna of the non-shielded sensor element 11 and/or the shielded sensor element 14 is the antenna of the RFID label. An RFID label may include at least three parts: an integrated circuit that stores and processes information and that modulates and demodulates radio-frequency (RF) signals; a DC power collector collecting DC power from the incident reader signal; and an antenna for receiving and transmitting the signal.

RFID technology uses electromagnetic fields to automatically identify the labels, which may contain electronically-stored information. In case of passive labels, they collect energy from a nearby RFID reader's interrogating radio waves while active labels have a local power source (e.g. a battery) and may operate hundreds of meters from the RFID reader. An active label has an on-board battery and periodically transmits, for example, its ID signal (i.e. data uniquely identifying the label).

Figure 3:
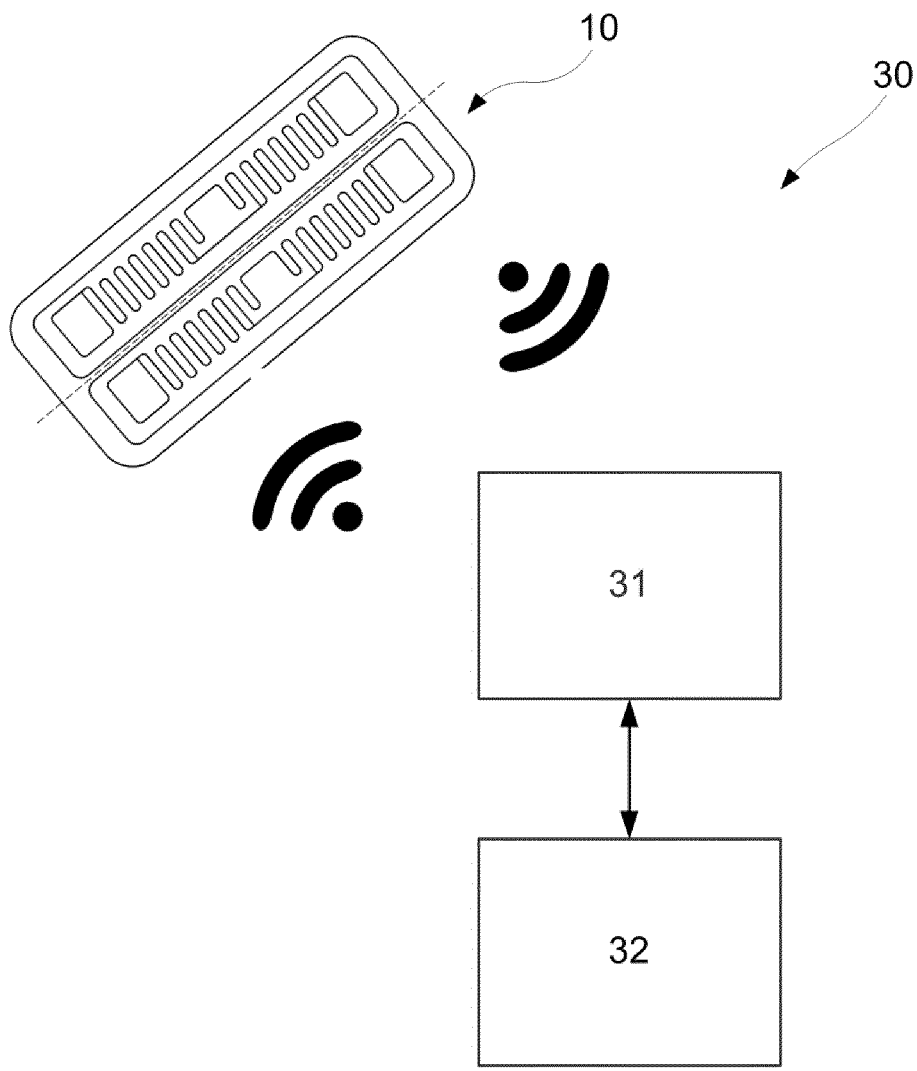
FIG. 3 illustrates a block diagram of a system for detecting moisture, for example, when a liquid leakage has occurred, according to some examples.

According to some examples, as in FIG. 3, the described moisture sensor 10 may be included in a system 30 for detecting moisture, for example, due to a liquid leakage. The system may include at least one moisture sensor 10 as previously disclosed, a reader module 31 configured to receive at least one response signal from the non-shielded sensor element 11 and at least one response signal from the shielded sensor element 14 included in the moisture sensor 10 and to obtain at least one feature of the response signal received from the non-shielded sensor element 11 and the same feature of the response signal received from the shielded sensor element 14, and a control module 32.

A reader module 31 may include, for example, a static set of antennas (e.g. an arch of antennas) or at least one hand-held reader.

In some examples, the reader module 31 may require placing one or more antennas able to retrieve information from the moisture sensor 10. The position of the antennas should allow all the moisture sensors to be read. Then, according to the readings, the reader module 31, from the response signal received from each moisture sensor, obtains determined features (e.g. signal strength, signal phase, etc.) and generates samples from each moisture sensor 10 as a data structure such as:

| Moisture sensor | | |
| --- | --- | --- |
|  | Label 1 | Label 2 |
| Timestamp | Time$_1$ | Time$_2$ |
| Electronic Product Code | EPC$_1$ | EPC$_2$ |
| Received Signal Strength Indicator (RSSI) | RSSI$_1$ | RSSI$_2$ |
| Radio Frequency Phase (PHASE) | PHASE$_1$ | PHASE$_2$ |
| Other high or low level data | X$_1$ | X$_2$ |

For instance, the first sample from the moisture sensor 10 may include the following information:

$A^1 := \{Time^1_1, EPC^1_1, RSSI^1_1, PHASE^1_1, X^1_1, Time^1_2, EPC^1_2, RSSI^1_2, PHASE^1_2, X^1_2\}$ wherein Label 1 may be the non-shielded sensor element 11 and Label 2 may be the shielded sensor element 14.

The samples may be sent to the control module 32 to be processed, that is, to determine if moisture is detected by the moisture sensor 10.

It is required that the reader module 31 obtains the necessary number of data samples to allow the correct performance of the control module 32.

Consequently, the reader module 31 may interrogate (e.g. at the same time or at about the same time so that the response signal of each sensor element 11,14 is obtained under the same conditions) the non-shielded sensor element 11 and the shielded sensor element 14 and receive a response signal from each sensor element. Then, the reader module 31 may obtain at least one feature (e.g. signal strength, signal phase, etc.) from each response signal and may also obtain data (e.g. data uniquely identifying each sensor element) and send them to the control module 32 to be processed.

Alternatively, instead of using a static set of antennas for obtaining the information from the moisture sensors, a hand-held reader could also be used.

The benefits of this approach are a larger flexibility for reading each moisture sensor, and avoiding the need for the antenna infrastructure, and thus, being able to perform the reading operation at different places.

The drawbacks of this approach are the inherent variability of human actions. For example, missing sensors, reading the moisture sensors at different distances or using different times, and thus, obtaining different results. Moreover, although it would improve automatization compared with the current manual approach, human intervention would still be necessary.

In case of the sensor elements 11,14 of the moisture sensor 10 including RFID labels, information from the moisture sensor may be wirelessly retrieved from standard RFID readers (i.e. the reader module 31), using standard operations. An RFID reader 31 may include:

One or more antennas: each antenna is used to send energy to the labels using radio frequency waves, sending requests to the labels, and receiving response signals from the labels;

Radio frequency module: each antenna is connected to a radio frequency module responsible to transform information to/from radio frequency waves;

Electronics: responsible to transmit information between the radio frequency module and the information system;

Information system: stores the necessary operations and commands to operate the whole reader system.

Other alternative wireless technologies to RFID may be used to obtain response signals from the sensor elements 11,14 of the moisture sensor 10, such as short-range communication technologies, for example, Bluetooth (e.g. BLE—Bluetooth Low Energy), NFC, Zigbee or WiFi technology.

In case of using any other wireless technologies (for example, any of those described above), the configuration of the reader module 31 may be the same but adapted to the corresponding technology.

The RFID label information is stored in a non-volatile memory. An RFID reader transmits an encoded radio signal to interrogate the label. The RFID label receives the radio signal (i.e. the response signal) and may respond with its identification and other information. This may be only a unique label serial number and, since each label has individual serial numbers, the system may discriminate among several labels that may be within the range of the RFID reader and read them simultaneously.

In the case of the present moisture sensor 10, the RFID reader 31 transmits an encoded radio signal to interrogate each label of the moisture sensor 10 and receives a response signal from each RFID label, that is, each sensor element 11,14. Then, the RFID reader 31 obtains at least one feature and data of each response signal, and sends them to the control module 32.

The control module 32 may include or may be implemented by electronics, computers or a combination of them, that is, the electronics or computers may be used interchangeably so that a part of the described may be electronics and the other part may be computers, or all described may be electronics or all described may be computers.

Examples of a control module 32 including only electronics (that is, a purely electronic configuration) may be a programmable electronic device such as a CPLD (Complex Programmable Logic Device), an FPGA (Field Programmable Gate Array) or an ASIC (Application-Specific Integrated Circuit).

Examples of a control module 32 including only a computer may be a computer system (e.g. a laptop, a server, a desktop computer, an embedded or industrial computer, etc.), which may include a memory and a processor, the memory being adapted to store a set of computer program instructions, and the processor being adapted to execute these instructions stored in the memory in order to generate the various events and actions for which the control module has been programmed.

The computer program may include program instructions for causing the control module 32 to perform a method of detecting moisture (e.g. due to a liquid leakage) that will be described later. The computer program may be embodied on a storage medium such as a ROM, for example a CD ROM or a semiconductor ROM, a magnetic recording medium, for example a hard disk, a solid-state disk (SSD), a USB flash drive (for example, a pen drive); or a non-volatile memory card such as a SD, miniSD or microSD card. In addition, the computer program may be carried on a transmissible carrier such as an electrical or optical signal, which may be conveyed via electrical or optical cable or by radio or other.

When the computer program is embodied in a signal that may be conveyed directly by a cable or other device, the carrier may be constituted by such cable or other device.

Alternatively, the carrier may be an integrated circuit in which the computer program is embedded, the integrated circuit being adapted for performing, or for use in the performance of, the relevant methods.

The computer program may be in the form of source code, object code, a code intermediate source and object code such as in partially compiled form, or in any other form suitable for use in the implementation of the method. The carrier may be any entity or device capable of carrying the computer program.

Furthermore, the control module 32 may also have a hybrid configuration between computing and electronics. In this case, the control module may include a memory and a processor to implement computationally part of its functionalities and certain electronic circuits to implement the remaining functionalities.

In any case, the control module 32 may be configured to execute a method of detecting moisture (for example, due to a liquid leakage). The control module may be included in a system for detecting moisture. The system may include at least one moisture sensor as described above, a reader module 31 configured to receive at least one response signal from the non-shielded sensor element 11 and at least one response signal from the shielded sensor element 14 included in the moisture sensor 10 and to obtain at least one feature of the response signal received from the non-shielded sensor element and the same feature of the response signal received from the shielded sensor element, and the control module. The method may include, for each moisture sensor 10:

- the control module 32 receiving the feature of the response signal of the non-shielded sensor element 11, from the reader module 31;
- the control module receiving the same feature of the response signal of the shielded sensor element 14, from the reader module;
- the control module comparing the received feature of the response signal of the non-shielded sensor element with the same received feature of the response signal of the shielded sensor element;
- the control module determining the detection of moisture if the difference between the feature of the response signal of the non-shielded sensor element and the feature of the response signal of the shielded sensor element is significant.

The significant difference to determine moisture may be based on a threshold (it may be different under different conditions) or may be based on a variation value (e.g. a variation of at least 20% from the standard deviation may be established to determine moisture).

Features may be, for example, the strength or the phase of the response signal.

In addition, the reader module 31 may obtain data from the response signal of the non-shielded sensor element 11 and/or from the response signal of the shielded sensor element 14. The data may include data uniquely identifying the moisture sensor 10. In case of the response signal of the non-shielded sensor element 11 are too altered (for example, because the modulation of the response signal is not robust enough), the moisture sensor 10 may be identified by data uniquely identifying the moisture sensor obtained from the response signal of the shielded sensor element 14. Data uniquely identifying the moisture sensor associated to each sensor element may be stored in a repository (e.g. a database) such that the moisture sensor 10 may be identified from data of any of the sensor elements 11,14. Then, the reader module 32 may send the data together with the obtained features to the control module 32 so that the features may be associated to data and the control module may know to which moisture sensor 10 corresponds the received features. The data and features may be stored in a repository (e.g. a database).

In some examples, the method may further include obtaining the location of the moisture sensor 10 based on data uniquely identifying the moisture sensor 10 and the strength of the response signal from the non-shielded sensor element 11 and/or from the response signal of the shielded sensor element 14. The position or location of a sensor element (e.g. a RFID label) may be determined by the strength of the received response signal. There are propagation models that relate the received signal strength with the distance of the sensor element. If this situation is combined with readings from different positions (e.g. in an arch of readers) combined with data uniquely identifying the sensor element, it is possible to determine with redundancy the distance between different readers and the sensor element.

Furthermore, the method may include generating a warning relating to detected moisture (or a liquid leakage) through a warning module (not shown). This way, the reader module 31, the control module 32 or both may include a warning module configured to generate a warning when it is determined that moisture is detected (for example, because a liquid leakage has occurred). The warning module may include at least one of the following sub-modules:

- a sub-module including at least one warning element for generating an audible warning (e.g. a speaker, a buzzer, etc.);
- a sub-module including at least one warning element for generating a visual warning (e.g. a display screen (LCD, OLED, QLED, etc.), a plurality of Light Emitting Diodes (LED), etc.);

a sub-module including at least one warning element for generating a haptic warning (e.g. a vibrator motor).

Additionally or alternatively, the warning module may include a telephone sub-module (not shown). The telephone sub-module may be configured to generate external warnings, which may include making a telephone call to at least one established telephone number (e.g. the telephone number of any person related to the system). Further or alternatively, if the telephone module includes mobile data (e.g. mobile Internet data), the telephone module may generate external warnings such as electronic messages (for example, an SMS, an email, a Whatsapp or Telegram message, etc.), for example, to any person related to the system so that the person may know that moisture is detected.

The generated warning may include data, for example, relating to the location of the moisture sensor 10 such that it is possible to detect moisture and also know the location of the moisture sensor where the moisture has been detected.

The communication between the reader module 31 and the control module 32 may be wired (for example, through Ethernet technology) or may be established through short-range communication technologies, for example, Bluetooth (e.g. BLE—Bluetooth Low Energy), NFC, Zigbee or WiFi technology or through a communication network based on Internet of Things (IoT), such as Sigfox, LoRA or NB-IoT.

If the control module 32 and the reader module 31 are far away, they may be connected through long-range wireless communication technologies such as GSM, GPRS, 3G, 4G, 5G or satellite technology or wired technologies (for example, through optical fiber, ADSL, etc.).

Consequently, both the control module 32 and the reader module 31 may include a communication module (not shown) adapted or compatible with the selected communication technology.

Following, an example of use of a system for detecting a moisture will be disclosed according to FIG. 4. This example is based on an assembly line of vehicles, for example, cars, with the aim of automatically and in unassisted manner detecting water leakage inside de vehicles in the assembly line, and similar scenarios. Because the previously disclosed moisture sensors 10 are used, the detection is performed by low cost (<10 cents of euro) battery-less sensors that are pre-deployed inside the vehicle during the manufacturing process. Those moisture sensors, after a water test, are polled by readers (for example, RFID readers if the sensor elements of the moisture sensor include RFID labels) in order to determine if any water leakage has occurred. The system detects levels of moisture corresponding to a leakage and automatically may locate their position without human intervention. The operator is warned by the system about a detected moisture and its location without the need to enter inside the vehicle. The moisture sensors may be dropped inside the vehicle under manufacturing.

The used moisture sensors do not need to be removed by the operators at the end of the assembly or testing tasks.

In some examples, during the assembly process of a vehicle, subsequent sealing tests are performed in order to determine if there are holes, not properly assembled parts, or scratches that may cause water leakages inside the vehicle. Today's solution is based on handheld device carried by the operator that measures strategic points inside the vehicle. This approach has different drawbacks including a training process for the operators, a slow measurement process as the operator needs to measure different points inside the vehicle one by one, a manual reporting of this data which is prone to errors or inaccuracies. The process may take 2-3 minutes to be conducted being a major bottleneck in the automatized production chain.

As can be seen in FIG. 4, one or more moisture sensors 10 as described above are disposed inside a car 40 in places where it is important to check whether water has been leaked during the assembly line (e.g. during a water test). These moisture sensors may be placed ad-hoc by the car manufacturer or enter the assembly line integrated with the car elements from different providers. In the example of FIG. 4, each sensor element 11,14 of each moisture sensor 10 may include an RFID label, more specifically, an UHF passive RFID label.

In addition, FIG. 4 illustrates a reader module 31 including a plurality of antennas 41a to 41g. The antennas point to the assembly line, able to retrieve information from the moisture sensors 10 inside the car. The position of the antennas should allow all the moisture sensors inside the car to be read. The reader module is easily integrable in the production chain, for example, as an arch of antennas, each of which sending energy to the RFID labels using radiofrequency waves, sending requests to the labels and receiving the response signals from the labels. Thus, samples are generated from each moisture sensor 10. For instance, a first sample from a moisture sensor A may include the following information:

$A^1 := \{\text{Time}^1_1, \text{EPC}^1_1, \text{RSSI}^1_1, \text{PHASE}^1_1, X^1_1, \text{Time}^1_2, \text{EPC}^1_2, \text{RSSI}^1_2, \text{PHASE}^1_2, X^1_2\}$ wherein 1 relates to the non-shielded sensor element 11 and 2 relates to the shielded sensor element 14 of the moisture sensor A.

The reader module 31 also may include a radio frequency module 42 responsible to transform information to/from radio frequency waves. Each antenna is connected to the radio frequency module 42. The reader module may also include electronic module 43 that is responsible to transmit information between the radio frequency module and the control module 32.

The connection between each antenna and the radio frequency module 42 may be wired (for example, through Ethernet technology) or may be established through short-range communication technologies, for example, Bluetooth (e.g. BLE—Bluetooth Low Energy), NFC, Zigbee or WiFi technology or through a communication network based on Internet of Things (IoT), such as Sigfox, LoRA or NB-IoT.

At this point it may be noted that the time (timestamp), signal strength, signal phase, etc. are obtained by the reader module 31 from the response signal received from each RFID label, that is, the reader module interrogates the RFID labels (at least two in each moisture sensor, one shielded RFID label and one non-shielded RFID label) and obtains the features and data from each received response signal and the time in which each response signal is received.

The control module 32, for example, as described above, is in charge to collect the necessary amount of data samples per test, from each moisture sensor deployed inside the car. For each set of samples from each sensor $A := \{A^1, A^2, A^3, \ldots A^n\}$ the control module 32 may consider the following information:

the position of the labels: $f_{position}\{A\}$;
information on the returned RSSI values: $f_{RSSI}\{A\}$;
information on the returned PHASE values: $f_{PHASE}\{A\}$;
information on other retrieved values: $f_{OTHER}\{A\}$.

Based on this information, the control module 32 may determine if each RFID label of a moisture sensor (in this case, the moisture sensor A) is wet or dry:

Test(A)=f($f_{position}${A}, $f_{RSSI}${A}, $f_{PHASE}${A}, $f_{OTHER}${A})={WET,DRY}

In summary, the disclosed system for detecting a water leakage in a vehicle production line offers the following advantages that may be described in three points:
- on one hand, improved automatization reduces errors due to human intervention in the production chain, also reducing production time, and thus costs;
- also, the moisture sensors are based on off-the-self RFID labels as sensor elements 11,14, which reduces the moisture sensor cost;
- on the other hand, the solution based on standards allows for better integration in the industry (e.g. provider independence).

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples but should be determined only by a fair reading of the claims that follow.

Further, although the examples described with reference to the drawings include computing apparatus/systems and processes performed in computing apparatus/systems, the inventions hereof also extend to computer programs, particularly computer programs on or in a carrier, adapted for putting the system into practice.

The invention claimed is:

1. A system for detecting moisture comprising:
at least one moisture sensor comprising:
at least one sensor element non-shielded against liquids comprising:
a first RFID label comprising at least a first antenna, and
a first element made of a liquid absorbing material, said material being configured to absorb and drive liquid to the antenna of the first RFID label when liquid is in contact with the material such that, when the liquid is in contact with the antenna, the matching of the first antenna is modified thereby modifying the phase of a response signal of the antenna of the first RFID label;
at least one sensor element shielded against liquids comprising:
a second RFID label comprising at least a second antenna, and
a second element made of a liquid proof material, the element being configured to not conduct liquid,
a reader module, the reader module comprising a static set of antennas, each of the antennas of the static set of antennas being configured to receive:
at least one response signal from the sensor element non-shielded against liquids and
least one response signal from the sensor element shielded against liquids and
to obtain the phase of the response signal received from the sensor element non-shielded against liquids and the phase of the response signal received from the sensor element shielded against liquids,
a control module being configured to:
receive the feature of the phase of the sensor element non-shielded against liquids, from the reader module;
receive the phase of the response signal of the sensor element shielded against liquids, from the reader module;
compare the received phase of the response signal of the sensor element non-shielded against liquids with the received phase of the response signal of the sensor element shielded against liquids;
determine the detection of moisture if the difference between the phase of the response signal of the sensor element non-shielded against liquids and the phase of the response signal of the sensor element shielded against liquids is above a threshold.

2. A system according to claim 1, the reader module disposed to receive the response signal from the sensor element non-shielded against liquids and the response signal from the sensor element shielded against liquids at the same time.

3. A system according to claim 1, the control module further comprising a warning module configured to generate a warning when a moisture detection is determined.

4. A system according to claim 3, the warning module comprising at least one of the following sub-modules:
a sub-module comprising at least one warning element for generating an audible warning;
a sub-module comprising at least one warning element for generating a visual warning;
a sub-module comprising at least one warning element for generating a haptic warning.

5. A system according to claim 1, the reader module further comprising
a hand-held reader.

6. A method of detecting moisture using a system according to claim 1, the method comprising, for each moisture sensor:
the control module receiving the phase of the response signal of the sensor element non-shielded against liquids, from the reader module;
the control module receiving the phase of the response signal of the sensor element shielded against liquids, from the reader module;
the control module comparing the phase of the response signal of the sensor element non-shielded against liquids with the phase of the response signal of the sensor element shielded against liquids;
the control module determining the detection of moisture if the difference between the phase of the response signal of the sensor element non-shielded against liquids and the phase of the response signal of the sensor element shielded against liquids is above a threshold.

* * * * *